United States Patent [19]

Kortenbusch

[11] 4,029,362

[45] June 14, 1977

[54] ARRANGEMENT FOR HYDRAULICALLY CONVEYING SOLIDS

[75] Inventor: Werner Kortenbusch, Lunen, Germany

[73] Assignee: Ruhrkohle AG, Essen, Germany

[22] Filed: Dec. 8, 1975

[21] Appl. No.: 638,563

[30] Foreign Application Priority Data

Dec. 7, 1974  Germany ............................ 2457943

[52] U.S. Cl. ................................................ 302/14
[51] Int. Cl.² ........................................ B65G 53/30
[58] Field of Search ............................... 302/14–16, 302/66

[56] References Cited

UNITED STATES PATENTS

| | | | |
|---|---|---|---|
| 3,140,123 | 7/1964 | Bowen | 302/14 |
| 3,449,013 | 6/1969 | Sakamoto et al. | 302/14 |
| 3,485,534 | 12/1969 | Wanzenberg et al. | 302/14 |
| 3,560,053 | 2/1971 | Ortloff | 302/14 |
| 3,842,522 | 10/1974 | Holzenberger et al. | 302/66 |

Primary Examiner—Evon C. Blunk
Assistant Examiner—Jeffrey V. Nase
Attorney, Agent, or Firm—Michael J. Striker

[57] ABSTRACT

An arrangement for hydraulically conveying solids especially coarse solids in form of a slurry includes three chambers which are cyclically and alternatingly filled with slurry at substantially the atmospheric pressure, and a pressurized hydraulic medium, such as water, discharges slurry from a full chamber into a discharge conduit. A plurality of supply conduits connects the sources of slurry and of the pressurized hydraulic medium with the chambers, and valves are interposed between the chambers and the conduits and operative for establishing and interrupting the communication of the conduits with the chambers. A control arrangement controls the operation of the valves as a function of time and of condition prevailing in the conduits and in the chambers so that continuous flow of slurry is obtained in the discharge conduit. The control arrangement is constructed as a step-by-step control unit the operation of which is dependent on signals indicative of pressure in the chambers, density of the slurry, positions of the various valves, and positions of timing devices.

11 Claims, 2 Drawing Figures

ARRANGEMENT FOR HYDRAULICALLY CONVEYING SOLIDS

BACKGROUND OF THE INVENTION

The present invention relates to an arrangement for hydraulically conveying solids in form of a slurry in general, and more particularly to a three-chamber hydraulic conveying arrangement.

There are already known various arrangements of the type here under consideration, particularly for use in hydraulically conveying coal, ore and similar particulate material over substantial elevational differences such as, for instance, 1,000 meters and/or large distances. One of such conventional arrangements includes a three-chamber conveying arrangement which is filled and discharged in countercurrent and in which valves are provided at the spaced ends of the chambers.

The prior art has been faced with the problem of conveying particulate material over large distances and/or over substantial elevational differences, and several solutions to such a problem have already been proposed. One of the most economical and efficient arrangements for conveying particulate material in form of a slurry involves a pressurizable chamber which can be operated on the principle of a lock or a sluice. To be more precise, the chamber is filled with a slurry at nominal superatmospheric pressure so that conventional slurry pumps which are capable of pumping slurry in substantial quantities but with only a small pressure head, can be used for this purpose. On the other hand, once the chamber is filled with slurry, further filling with slurry is terminated and pressurized hydraulic fluid, such as water, is admitted into the chamber and discharges the slurry therefrom into a discharge conduit through which the slurry is conveyed to another location of use or for treatment. Inasmuch as the medium which propels the slurry into the discharge conduit is clear water, that is water which does not contain any substantial amount of particulate material entrained therein, high-output pumps, such as centrifugal pumps, which are capable of generating substantial velocity and pressure heads, but which are sensitive to the influence of particulate material entrained in the fluid being pumped, can be used for discharging the slurry from the chamber into the discharge conduit. Such high-output pumps are very efficient, and also economical to operate.

It will be appreciated that, if only one such chamber were used, the flow of the slurry in the discharge conduit would be intermittent, which will be very disadvantageous, particularly since the material entrained in the fluid column in the discharge conduit would settle during the period of interruption and thus clog the discharge conduit. Therefore, it has already been proposed to utilize two or three chambers in an arrangement for hydraulically conveying solids, which chambers are similarly configurated and arranged and operated all in the same way. The chambers are generally elongated and provided with valves at their ends, which valves control the filling and the emptying of the respective chambers. Furthermore, it is also already known to provide pressure equalization valves at the ends of the chambers, such pressure equalization valves serving the purpose of bringing, without water hammer effect, the filled chamber to the pressure delivered by the high-output pump, and the chamber which is emptied from the slurry to the atmospheric pressure preparatory to filling of the chamber with a further charge of slurry. The pressure is in the chambers is measured by means of conventional pressure-measuring devices. The conventional arrangements of this type further include a slurry pump as well as a pump for the pressurized hydraulic fluid, with their associated control devices which are capable of varying the filling and the discharging speed, and a specific weight measuring device for monitoring the concentration of the slurry.

The multi-chamber arrangements operate in accordance with the lock principle which has been discussed above, that is, each of the chambers is filled with the slurry delivered by the slurry pump at only slightly above the atmospheric pressure, and is emptied at a pressure delivered by the pump for the pressurized hydraulic fluid. This multi-chamber arrangement avoids the formation of sedimentation beds in the discharge conduit, and thus clogging of the discharge conduit, in that such an arrangement is capable of maintaining steady flow of the slurry through the discharge conduit.

The arrangements of this type are operated either in the concurrent, or in the countercurrent manner. In the first case, both the low pressure slurry and the high pressure hydraulic fluid are admitted at the same end of the chamber, and the pressurized slurry is discharged from the chamber into the discharge conduit at the other end of the chamber. In a countercurrent arrangement, the low-pressure slurry is admitted into the respective chamber at one end thereof, and discharged therefrom at the same end, the pressurized hydraulic fluid being admitted into the chamber at the other end thereof. The latter arrangement is more advantageous, particularly inasmuch as the chamber is completely emptied of slurry using the same amount of water, in that the larger and, consequently, heavier particles, which heavier particles have a higher degree of slippage relative to the carrier fluid than lighter particles, accumulate in the region of entry into the chamber, so that such heavier particles have to traverse a smaller distance to be discharged from the chamber than light particles.

Such hydraulic conveying arrangements are not usually built for continuous filling operations. In other words, the conventional arrangements, while assuring continuous flow in the discharge conduit, do not assure continuous flow of discharging slurry and do not assume continuous flow in the supply conduit of the low-pressure slurry. This is particularly true in view of the fact that relatively long time periods are needed for equalizing the pressure in the chambers, that is bringing the pressure in a full chamber to that of the pressurized hydraulic medium, or reducing the pressure of an empty chamber to substantially the atmospheric pressure. During such time periods, the filling operations must be interrupted inasmuch as the chambers can be filled only at about the atmospheric pressure. In order to assure the continuity of flow of the pressurized fluid through the discharge conduit, additional amounts of clear pressurized hydraulic fluid are forced through the discharge conduit. This means that not only is the efficiency of the arrangement reduced, but also additional amounts of the hydraulic fluid must be available. Also, the filling operation requires a longer period of time than the discharging operation so that, even if the pressurized hydraulic fluid is directly admitted into the discharge conduit during a period of pressure equalization, so that the additional pressurized hydraulic fluid need not flow through the empty chamber so that the pressure therein can be reduced simultaneously with increasing the pressure in the full chamber, the substantial difference between the filling and emptying time periods still necessitates availability of substantial amounts of additional pressurized hydraulic medium.

One of the most important disadvantages of the conventional hydraulic conveying arrangements is to be seen in the fact that the conveying capacity of the arrangement is rather low, especially in view of the fact that the slurry is unnecessarily diluted by the additional amounts of pressurized hydraulic fluid which need be introduced into the system during the pressure-equalization operation.

The conventional hydraulic conveying arrangements have chambers, preferably of tubular configuration, which are approximately 200 to 600 meters long. Thus, it will be appreciated that the filling and discharging times of such chambers are substantial, and so is the difference between the time needed for filling the chamber and the time required for emptying the chamber. Therefore, it is evident that any reduction in such difference by properly operating the chambers in sequence results in improvements in efficiency of the arrangement.

The chambers of the arrangement are all of equal lengths and, because of their substantial lengths, they may be bent once or several times in order not to take up an inordinate amount of space and to facilitate their operation and control.

SUMMARY OF THE INVENTION

Accordingly, it is a general object of the present invention to avoid the disadvantages of the prior art.

More particularly, it is an object of the present invention to provide an arrangement for hydraulically conveying solids in the form of a slurry which can be operated on a continuous basis.

It is a further object of the present invention to provide a hydraulic conveying arrangement which is simple in construction and efficient and reliable in operation.

It is a concomitant object of the present invention to provide a hydraulic conveying arrangement which requires only a small amount of additional pressurized hydraulic fluid for its operation.

Yet another object of the present invention is to provide a hydraulic conveying arrangement in which the danger of clogging of the various conduits is avoided.

In pursuance of these objects and others which will become apparent hereafter, one feature of the present invention resides, briefly stated, in an arrangement for hydraulically conveying solids in the form of a slurry, in a combination which comprises a plurality of chambers; a source of slurry; a source of pressurized hydraulic fluid; conduit means including a plurality of supply conduits communicating the sources with the chambers, and at least one discharge conduit; valve means which is movable between open end closed positions thereof and operative for establishing and interrupting communication between the conduits and the chambers; means for moving the valve means between the positions thereof; and means for controlling the moving means as a function of time and conditions prevailing in the conduits and in the chambers so that, while the source of slurry charges one of the chambers with slurry, the pressurized hydraulic fluid discharges slurry from another chamber into the discharge conduit, whereby a continuous flow of pressurized slurry is obtained in the discharge conduit.

In a currently preferred embodiment of the present invention, the control means of the arrangement includes at least one timing device which generates first signals, at least one pressure measuring device which generates second signals indicative of instantaneous pressure conditions in the chambers and the conduits, and an arrangement which generates third signals indicative of the instantaneous positions of the valve means. The control means of this embodiment operates as a step-by-step control arrangement which controls the valve means in succession in response to the signals. According to a further concept of the present invention, the chambers can be used in a hydraulic conveying system as pressure-amplifying members of the system. In such a system, a plurality of such arrangements can be utilized which are arranged in series so that at least the first arrangement in the series is filled with slurry from a receptacle, which slurry is then forwarded to the other arrangements in the series, either directly or indirectly via an intermediate slurry receptacle. When the arrangement of the present invention for hydraulically conveying solids in form of a slurry is constructed and operated as proposed by the present invention, the output of the arrangement in terms of the amount of particulate material conveyed is increased by approximately 50% as compared to the conventional arrangements of a similar type, and the wear of the movable parts of the arrangement, such as the valves, lessened so that the efficiency and the reliability of the arrangement is significantly improved. Also, the ratio of the particulate material to the carrier hydraulic fluid, such as water, can be controlled much more easily and reliably than heretofore known, particularly inasmuch as not only the discharging operation, but also the filling operation is performed in a continuous manner. This brings about a further advantage over the conventional arrangements in which the slurry pump operates on an intermittent basis, which is to be seen in the avoidance of the possibility that the inlet of the slurry pump may be obstructed by particulate material in the container which has settled or has been delivered to the region of the pump inlet by a conveying in the slurry receptacle. Inasmuch as the slurry pump is now operating on a continuous basis, this and other problems in connection with starting the operation of the slurry pump have been avoided.

A particular advantage which is of special importance in the mining industry is that the slurry can be much more easily handled in a treatment station to which the slurry is delivered by the hydraulic conveying arrangement of the present invention. This easier handling results from the fact that the slurry is much more concentrated than heretofore possible.

It is to be mentioned that the particulate material may be obtained by cutting coal from the seam by hydraulic jets, whereby simultaneously the low-pressure slurry is obtained, after larger particles have been reduced in a conventional crusher in sizes to approximately one third of the pipe diameter, such slurry being stored in the slurry receptacle.

The slurry is then given into the chambers, while their clear water filling from the preceding discharge cycle is discharged from these chambers into the clear water receptacle to be used for discharging, at high pressure, the slurry from the chambers. Thus, water is circulated in the arrangement so that only small amounts, if any, of additional water are to be added to the clear water receptacle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DISCUSSION OF THE PREFERRED EMBODIMENTS

Figure 1:
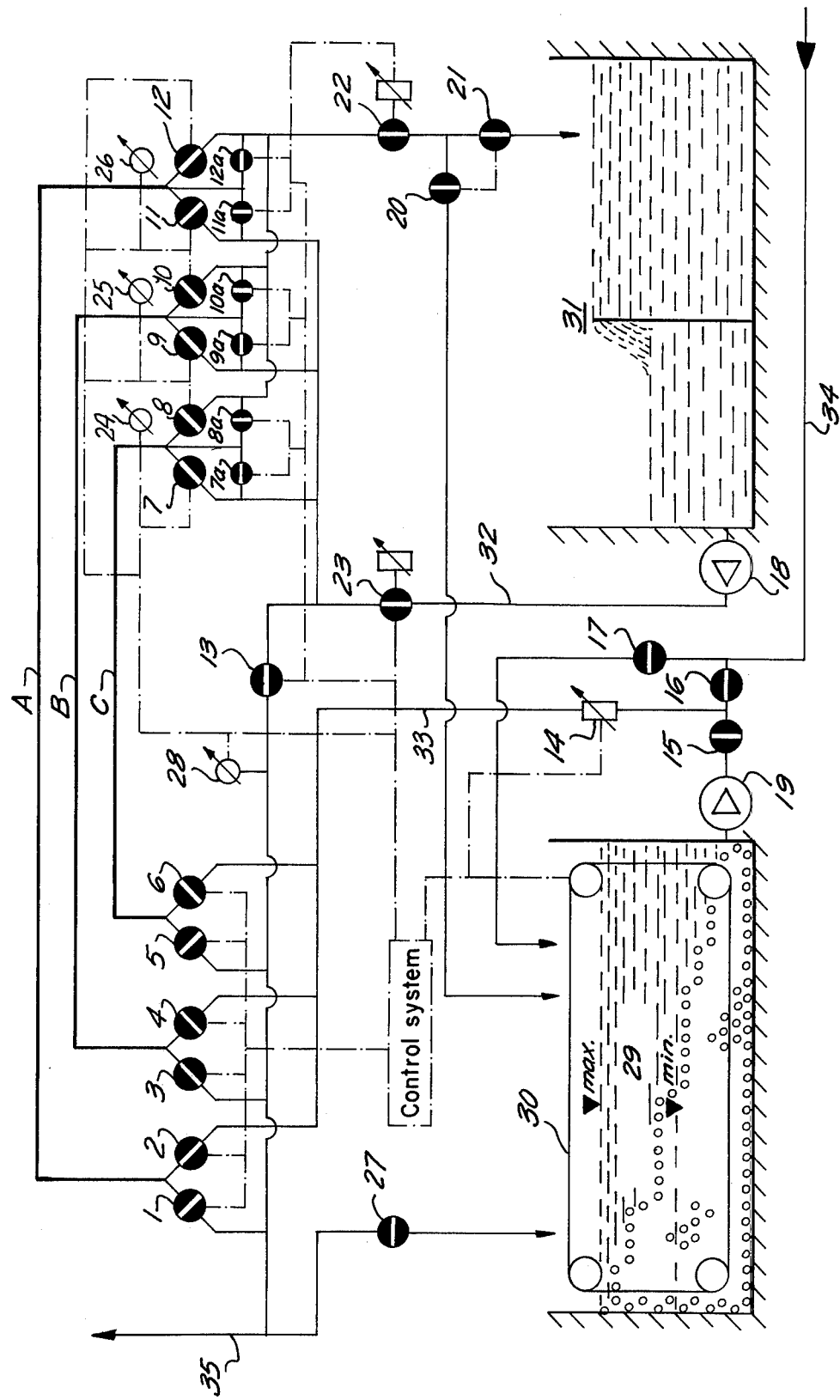
FIG. 1 is a schematic view of a three-chamber arrangement for hydraulically conveying solids in form of a slurry, according to the present invention.

Referring now to the drawings, and first to FIG. 1, it may be seen that the arrangement includes three chambers A, B and C which are elongated and have at their ends main valves 1 to 12 and pressure equalization valves 7a to 12a. The valves 1 to 12 and 7a to 12a are movable between closed and open positions, and conventional moving arrangements, which have not been illustrated, are used for moving the valves 1 to 12 and 7a to 12a in a predetermined sequence between the closed and open positions thereof. A central control system is provided which controls the operation of the moving arrangements and thus the movement of the valves 1 to 12 and 7a to 12a between the closed and open positions. The control system further includes pressure measuring devices 24, 25 and 26 which measure the pressures prevailing in the chambers A, B and C. The speed of filling and the speed of discharging the chamber is monitored by measuring and control arrangements 22 and 23, and such speeds are adjusted to the particular requirements. Such adjustment of the speeds of filling and discharging can be performed either manually by the operating personnel, as well as automatically by the central control system. Such a constant monitoring and adjusting is necessary, in that changes in the slurry concentration and in the specific weight of the particulate material may result in a change of the operating pressures and thus in changes in the speed of filling or discharging. The slurry is accommodated in a receptacle 29, and a feeding conveyor 30 forwards the particulate material toward the inlet of the slurry pump 19. The slurry pump 19 pumps the slurry into a conduit 33, via a valve 15, which conduit 33 communicates with the chambers A, B, C via the valves 2, 4 and 6. A specific weight measuring device 14 is arranged in the conduit 33 and measures the concentration of the slurry delivered by the pump 19 from the receptacle 29. The concentration of the slurry in the conduit 33 can be adjusted by correspondingly operating the feeding conveyor 30 in the receptacle 29, which operation of the conveyor 30 can be adjusted either manually or automatically by the central control system.

Clear hydraulic fluid, such as water, is accommodated in a receptacle 31, and a pump 18 pumps the hydraulic fluid into a conduit 32 which communicates with the chambers A, B and C via valves 7, 9 and 11 and pressure equalization valves 7a, 9a and 11a parallel thereto. A discharge conduit 35 communicates with the valves 1, 3 and 5 of the chambers A, B, C, and a branch duct communicates the conduit 32 with the conduit 35, a valve 13 being interposed in the branch duct and operative for admitting the pressurized hydraulic fluid directly into the discharge conduit 35 whenever necessary. Thus, for instance, if the concentration of the slurry in the conduit 35 exceeds a predetermined value, the valve 13 may be opened and a certain amount of clear water can be admitted into the discharge conduit 35, whereby the slurry is diluted and the danger of clogging of the discharge conduit 35 is avoided. When the pressurized hydraulic medium is admitted directly into the conduit 35, the filling operation of the chambers A, B and C is interrupted. This can be performed either manually by the operating personnel, or automatically by the central control system based on the information derived from a measuring device 23 and the pressure measuring device 28. When the conditions prevailing in the discharge conduit 35 are too adverse, it is possible to empty the discharge conduit 35 into the slurry receptacle 29 by appropriately actuating a valve 27.

Valves 8, 10 and 12, and pressure-equalizing valves 8a, 10a and 12a parallel thereto, selectively communicate the chambers A, B and C with a conduit which communicates, via the device 22 either, when a valve 21 is open, with the clear water receptacle 31, or, when valve 20 is open, with the slurry receptacle 29.

When the arrangement of the present invention is used as a pressure amplifier in a hydraulic conveying system, the slurry which is supplied from a previous arrangement in the conveying system through a conduit 34 can be directly conducted into the chambers A, B and C through the conduit 33 by closing the valve 15 and opening a valve 16 interposed in a conduit communicating the conduits 33 and 34 with one another. On the other hand, the slurry from the conduit 34 can be discharged into the receptacle 29, in which event the valve 16 is closed and a valve 17 in a conduit leading to the receptacle 29 is opened. Of course, when the arrangement is used at the beginning of the conveying system, the line 34 and the valves 16, 17 and conduits associated therewith are omitted. Inasmuch as the receptacle 29 is the only source of slurry in this situation, also the valve 15 can be omitted, and the pump 19 pumps the slurry from the receptacle 29 and the metering conveying device 30 associated therewith to the chambers A, B and C.

Figure 2:
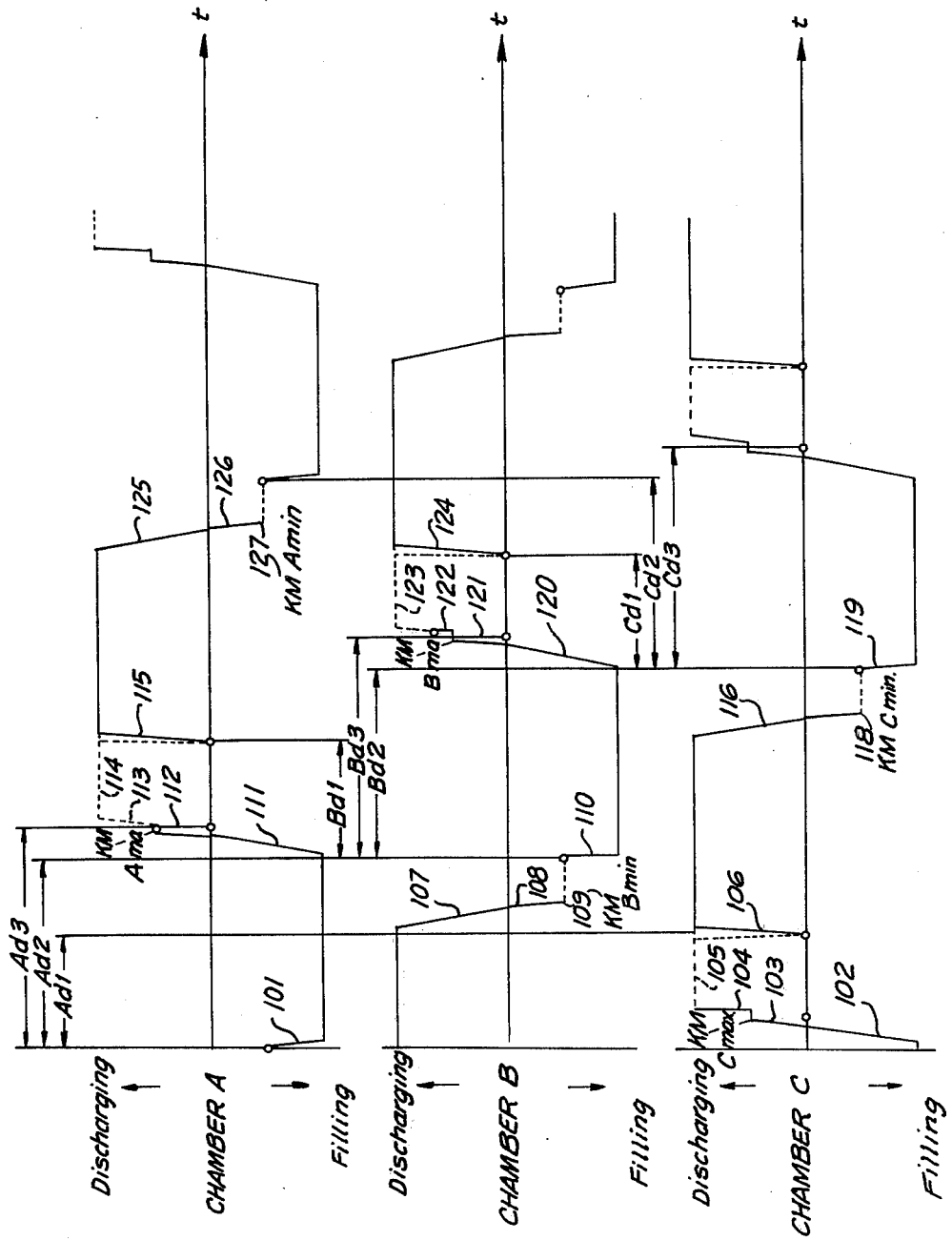
FIG. 2 is a diagram which illustrates the various phases of operation of the arrangement of FIG. 1 as a function of time.

Having so described the construction of the arrangement of the present invention, the operation of such an arrangement will now be discussed in some detail with reference to the diagram of FIG. 2. This diagram is to be read in connection with FIG. 1 disclosing the basic arrangement of the three-chamber hydraulic conveying arrangement. It is to be understood that the operation of the arrangement according to the diagram illustrated in FIG. 2 is obtained by utilizing a step-by-step control arrangement which incorporates only conventional elements, such as timing devices, which have not been illustrated because of their conventional constructions. The step-by-step control device operates on the basis of signals which are indicative of the positions of the valves 1 to 12 and 7a to 12a, on the signals derived from the pressure measuring devices 24, 25 and 26, and which are generated by timing devices $Ad_1$ to $Ad_3$, $Bd_1$ to $Bd_3$ and $Cd_2$ to $Cd_3$. Of course, the central control system may include further timing devices which may control different aspects of the operation of the arrangement.

A full operating cycle of the hydraulic conveying arrangement of the present invention will now be disclosed in connection with the operation of the chambers A, B, C. The beginning of the operating cycle is at a point where the chamber A is depressurized and ready to be filled, the chamber B is being discharged into the discharge conduit 35, and the chamber C is being filled from the supply conduit 33. In order to better understand the operation of the arrangement of the present invention, reference numerals 101 to 127 have been introduced into FIG. 2 which relate to various steps in the operation of the arrangement.

Step 101: The valves 2 and 12 of the chamber A are opened. Simultaneously therewith, the operation of the timing devices $Ad_1$, $Ad_2$ and $Ad_3$ is commenced. When the valves 2 and 12 are fully open, the pump 19 pumps the slurry into the chamber A via the conduit 33.

Step 102: The full opening of the valves 2 and 12 of the chamber A results in a signal which initiates closing of the valves 6, 8 and 8a of the chamber C. The closing of the valves 6, 8 and 8a results in termination of the filling operation of the chamber C.

Step 103: The closing of the valves 6, 8 and 8a of the chamber C results in a signal initiating the opening of the pressure equalizing valve 7a. The valve 7a brings about pressurization of the chamber C.

Step 104: The pressure measuring device 24 detects the reaching of the operating pressure.

Step 105: The pressure measuring device 24 generates a signal which initiates the opening of the valve 7, so that the chamber C is ready to be discharged. The timing device $Ad_1$ generates a signal for initiating the opening of the valve 5 of the chamber C.

Step 106: When the valve 5 is opened, the discharging operation of the chamber C sets in. The pressurized hydraulic fluid pump 18 delivers water from receptacle 31 through a supply conduit 32 into the chamber C.

Step 107: Simultaneously with the beginning of discharge of the chamber C, the opening of the valve 5 results in a generation of a signal which initiates the closing of the valves 3 and 9 as well as 9a of the chamber B so that the discharge operation of chamber B is terminated.

Step 108: When the valves 3, 9 and 9a are closed, a signal is generated which initiates opening of the pressure equalizing valve 10a in order to depressurize the chamber B.

Step 109: The pressure measuring device 25 associated with the chamber B detects the depressurization of the chamber B which is now ready to be filled with slurry. The timing device $Ad_2$ generates a signal initiating the opening of the valves 4 and 10 of chamber B.

Step 110: The opening of the valves 4 and 10 results in commencement of the filling operation of the chamber B. Simultaneously therewith, the timing devices $Bd_1$, $Bd_2$ and $Bd_3$ start their operation.

Step 111: The opening of the valves 4 and 10 results in generation of a signal initiating the closing of the valves 2, 12 and 12a so that the filling operation of the chamber A is terminated. Should the termination of the filling operation of chamber A be exceedingly delayed as a result of malfunction, the timing device $Ad_3$ discontinues the operation of the slurry pump 19 and of the metering conveyor 30 in order to avoid overfilling of the chamber A. Simultaneously therewith, a warning signal is generated in order to call the attention of the operating personnel to the situation.

Step 112: The closing of the valves 2, 12 and 12a results in a signal which initiates opening of the pressure-equalizing valve 11a so as to pressurize the chamber A.

Step 113: The pressure measuring device 26 detects the reaching of the operating pressure.

Step 114: A signal from the pressure measuring device 26 initiates opening of the valve 11 so that the chamber A is ready for discharging operation. A signal generated by the timing device $Bd_1$ initiates opening of the valve 1.

Step 115: When the valve 1 is open, the discharging operation of the chamber A is commenced.

Step 116: Simultaneously therewith, the now-open valve 1 generates a signal which initiates the closing of the valves 5 and 7 as well as 7a so that the discharging operation of the chamber C is terminated.

Step 117: The closing of the valves 5 and 7 as well as of the pressure-equalizing valve 7a results in a signal initiating the opening of the pressure-equalizing valve 8a in order to depressurize the chamber C.

Step 118: The pressure measuring device 24 detects the depressurization of the chamber C so that the latter is ready for commencement of a filling operation. The timing device $Bd_2$ generates a signal which initiates opening of the valves 6 and 8.

Step 119: When the valves 6 and 8 are open, the filling operation of the chamber C is commenced. Simultaneously therewith, the operation of the timing devices $Cd_1$, $Cd_2$ and $Cd_3$ is commenced.

Step 120: The opening of the valves 6 and 8 results in generation of a signal which initiates the closing of the valves 4 and 10 as well as 10a. In this manner, the filling operation of the chamber B is terminated.

Should the termination of the filling operation of the chamber B be unnecessarily delayed as a result of malfunction, then the timing device $Bd_3$ discontinues the operation of the slurry pump 19 and of the metering conveyor 30 so as to avoid overfilling of the chamber B. Simultaneously therewith, a warning signal is generated which calls the attention of the operating personnel to this situation.

Step 121: The closing of the valves 4, 10, as well as 10a results in generation of a signal which initiates the opening of the pressure-equalizing valve 9a so that the chamber B is pressurized.

Step 122: The pressure measuring device 25 detects the establishment of the operating pressure.

Step 123: The pressure measuring device 25 generates a signal which initiates opening of the valve 9 so as to make the chamber B ready for being discharged. The timing device $Cd_1$ generates a signal initiating the opening of the valves 3.

Step 124: When the valve 3 is open, the discharge operation of the chamber B is commenced.

Step 125: The opening of the valve 3 results in a signal which initiates the closing of the valves 1, 11 and the pressure-equalizing valve 11a so that the discharge operation of the chamber A is terminated.

Step 126: The closing of the valves 1, 11 and 11a results in generation of a signal commencing the opening of the pressure-equalizing valve 12a which depressurizes the chamber A.

Step 127: The pressure measuring device 26 detects the depressurization of the chamber A and thus the readiness thereof for the filling operation. The timing device $Cd_2$ generates a signal which initiates opening of the valves 2 and 12 so that the operating cycle is commenced anew.

The above-discussed steps are further periodically repeated in the same succession as discussed above, the timing device $Cd_3$ performing the same control function for the chamber C as the timing device $Ad_3$ performs for the chamber A and the timing device $Bd_3$ performs for the chamber B.

Even though other types of arrangements are also conceivable, it is particularly advantageous, according to a further concept of the present invention, to construct the control device as an electro-hydraulic unit. Such a unit has very advantageous characteristics, which are to be seen in particular in the short switching times of the valves, and a reliable detection of the positions of the valves, including feedback.

It is also possible to actuate a multitude of the valves simultaneously by means of throttling check valves, whether the valves have the same or different times of opening and closing.

While it appears from FIG. 2 and from the corresponding discussion that the pressure-equalizing valves 7a to 12a, which serve the purposes of pressurizing and depressurizing the chambers A, B and C, are always closed at the end of the discharging or filling operations, such closing of the pressure-equalizing valves 7a to 12a could take place at any time during the preceding discharging operation or filling operation.

The periods of time during which the chambers A, B and C stand ready for the following discharge operation are determined by the timing devices $Ad_1$, $Bd_1$ and $Cd_1$. However, these timing devices could give their signals only then when the state of readiness of the chambers A, B and C is arrived at as the result of the succession of the switching steps. The period for which the chambers A, B and C stand ready for commencement of the filling operations are determined by the timing devices $Ad_2$, $Bd_2$ and $Cd_2$, which devices could give the signals only then when the readiness of the chambers A, B and C is established as the result of the succession of steps.

It is possible to distribute the times of readiness equally between the filling and discharging operations. However, it is also possible to distribute the readiness periods differently in accordance with particular requirements arising from the intended application of the arrangement. The periods of time which are allowed by the timing devices for the discharging and the filling operation result from the chosen length of the chambers A, B and C and the selected speeds of flow of the slurry through the various conduits.

It will be understood that each of the elements described above, or two or more together, may also find a useful application in other types of constructions differing from the types described above.

While the invention has been illustrated and described as embodied in an arrangement for hydraulically conveying solids in form of a slurry, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an arrangement for hydraulically conveying solids, especially coarse solids, which includes a plurality of chambers which are to be sequentially charged with solids-containing slurry at low pressure and from which slurry is to be sequentially discharged at high pressure into a discharge conduit by a pressurized hydraulic fluid, a plurality of supply conduits which conduct the slurry and the pressurized hydraulic fluid from respective sources thereof toward said chambers, a plurality of valves which are movable between respective open positions for establishing and closed positions for interrupting flow of the slurry and of the pressurized hydraulic fluid into and out of the respective chambers, and means for moving said valves between said closed and open positions thereof, the improvement comprising means for equalizing the pressures in said chambers with those in said supply conduits; and means for sequentially controlling the operation of said pressure-equalizing means and of said moving means of said valves to simultaneously charge at least one of said chambers with low-pressure slurry and discharge high-pressure slurry from at least one other chamber into said discharge conduit, including means for sensing the conditions prevailing at least in some of said supply and discharge conduits and for generating signals representative of such sensed conditions, and means for sequentially actuating first said pressure equalizing means and then said moving means of said valves in dependence on said signals.

2. The improvement as defined in claim 1, wherein said control means includes timing means.

3. The improvement as defined in claim 1, wherein said sensing means includes at least one pressure measuring device.

4. The improvement as defined in claim 1, wherein said sensing means includes pressure-sensing means generating first of said signals which are indicative of pressure conditions in at least some of said discharge and supply conduits and in said chambers, and position-sensing means generating second of said signals indicative of the positions assumed by said valves; wherein said control means further includes timing means generating timing signals; and wherein said control means operates on a step-by-step basis to control said moving means of said valves in response to said first, second and timing signals.

5. The improvement as defined in claim 1; wherein said sensing means further includes slurry concentration measuring means arranged in said supply conduits intermediate the source of slurry and said chambers.

6. The improvement as defined in claim 1; and further comprising means for adjusting the slurry concentration in said supply conduit.

7. The improvement as defined in claim 6, wherein the source of the low-pressure slurry includes a container having an outlet opening; and wherein said adjusting means includes a conveyor in said container which transports solid components of the slurry toward said outlet opening.

8. The improvement as defined in claim 1, comprising a connecting conduit communicating the supply conduit for the hydraulic fluid with said discharge conduit; and a valve in said connecting conduit and operative for admitting the hydraulic fluid into said discharge conduit when the concentration of the pressurized slurry therein exceeds a predetermined value.

9. The improvement as defined in claim 1, comprising a relief conduit communicating said discharge conduit with the source of slurry; and a relief valve which can be opened to return the slurry to said source of slurry.

10. The improvement as defined in claim 1, wherein the arrangement is a part of a hydraulic conveying system and is operative as an intermediate pressure amplifier.

11. A method of conveying solids in form of a slurry, comprising the steps of providing at least two chambers; supplying low-pressure slurry to the chambers; admitting pressurized hydraulic fluid into the chambers to discharge pressurized slurry therefrom; equalizing the pressures in the chambers with those prevalent during said supplying and admitting steps, respectively; generating sensed signals indicative of the positions of the valves and pressures in the chambers; generating timing signals; and utilizing the sensed and timing signals for controlling the sequential operation of the chambers so as to first equalize the pressure in one of the chambers with that prevalent during the supplying step, then perform the supplying step, then equalize the pressure in the one chamber to that prevalent during the admitting step, and then perform the admitting step, in sequence, while the other chamber is operated in the same sequence but shifted in time relative to the operation of the one chamber, so that the low-pressure slurry is intermittently supplied to and the pressurized slurry is intermittently discharged from a respective one of chambers, whereas the discharge from all of the chambers is continuous.

* * * * *